(12) United States Patent
Yi et al.

(10) Patent No.: US 7,909,251 B2
(45) Date of Patent: Mar. 22, 2011

(54) MEMORY CARD PACK

(75) Inventors: Doo-jin Yi, Mapo-gu (KR); Do-il Kong, Cheonan-si (KR); Il-ki Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1032 days.

(21) Appl. No.: 11/653,987

(22) Filed: Jan. 17, 2007

(65) Prior Publication Data
US 2007/0181699 A1    Aug. 9, 2007

(30) Foreign Application Priority Data

Feb. 4, 2006   (KR) .................. 10-2006-0010919

(51) Int. Cl.
*G06K 7/06* (2006.01)
(52) U.S. Cl. ...................................... 235/451
(58) Field of Classification Search .......... 235/380, 235/382, 451, 476, 492
See application file for complete search history.

(56) References Cited

U.S. PATENT DOCUMENTS

| | | | | |
|---|---|---|---|---|
| 6,097,605 A * | 8/2000 | Klatt et al. | | 361/737 |
| 6,438,638 B1 * | 8/2002 | Jones et al. | | 710/301 |
| 6,648,224 B2 * | 11/2003 | Lee | | 235/451 |
| 6,681,991 B1 * | 1/2004 | Li | | 235/439 |
| 6,688,521 B2 * | 2/2004 | Cheng | | 235/451 |
| 6,976,624 B2 * | 12/2005 | Hsiao | | 235/451 |
| 7,114,659 B2 * | 10/2006 | Harari et al. | | 235/492 |
| 7,413,129 B2 * | 8/2008 | Fruhauf | | 235/492 |
| 2002/0011516 A1 * | 1/2002 | Lee | | 235/380 |
| 2003/0178486 A1 * | 9/2003 | Teng et al. | | 235/441 |
| 2004/0027879 A1 * | 2/2004 | Chang | | 365/200 |

FOREIGN PATENT DOCUMENTS

JP   2005-005176   1/2005

* cited by examiner

*Primary Examiner* — Seung H Lee
(74) *Attorney, Agent, or Firm* — Volentine & Whitt, PLLC

(57) ABSTRACT

A memory card pack includes an adaptor insertable in a memory slot of an application device and including a semiconductor chip having a control circuit therein and an expansion socket including a plurality of slots, each slot being configured to receive a memory card, and a plurality of contacts electrically connecting the control circuit to each memory card.

20 Claims, 4 Drawing Sheets

MEMORY CARD PACK

BACKGROUND OF THE INVENTION

1. Field of the Invention

The present disclosure relates generally to a memory card device and, more particularly, the present invention relates to a memory card pack capable of using a plurality of memory cards.

A claim of priority is made to Korean Patent Application No. 10-2006-0010919, filed Feb. 4, 2006, in the Korean Intellectual Property Office, the disclosure of which is incorporated herein in its entirety by reference.

2. Description of the Related Art

A memory card generally includes a nonvolatile memory chip, such as NAND type or NOR type flash memory, which retains stored data in the absence of supplied power. Examples of devices which utilize memory cards digital cameras, MP3 players, personal digital assistants (PDAs), mobile phones, and the like.

A memory chip used on the memory card typically includes a memory array containing a plurality of memory cells. In some cases, a control circuit that controls the memory array of the memory chip is also loaded in the memory card. Such a memory card that includes a memory array and a control circuit that controls the memory array is available commercially in many forms such as, for example, a memory stick card, a smart media card, a secure digital card, a mini secure digital card, an extreme digital card, and a multimedia card. Each of these forms of memory cards is available in a variety of configurations and memory capacities.

FIG. 1 is a perspective view illustrating an example of a memory card used for a digital camera. Referring to FIG. 1, a digital camera 10 includes a slot 15 in which a memory card 20 complying with a certain specification is inserted to store and read data. In general, more than one slot 15 may be provided to hold more than one memory card. The number of memory cards 20 used in the digital camera 10 may depend on a number of factors such as, for example, the size of the digital camera 10, the storage capacity of the camera 10, and so on.

The memory card 20 has an external connection pad 21 at its outer side. The external connection pad 21 may be used for an electrical connection with the digital camera 10. In order to achieve a competitive price and also facilitate capacity expansion (i.e., memory expansion), digital mobile device providers usually provide low-capacity memory cards such as, for example, 16MB or 32MB, and a memory card slot for the capacity expansion. Due to the increase in the number of uses provided by a single digital mobile device (e.g., a digital camera can be used these days to capture movies in addition to still photographs), there is a growing demand for high capacity storage devices. Therefore, consumers are more prone to buying high capacity memory cards or more than one memory card that is usable in digital mobile devices having expandable memory slots.

However, memory cards for different digital devices are not compatible with each other. This incompatibility exists because different digital devices use memory cards of different specifications and each existing memory card itself has a control circuit chip that is peculiar to the type of memory card. Accordingly, in order to expand the memory capacity on a digital device, a user must buy a high-capacity memory card dedicated to a certain application device.

SUMMARY OF THE INVENTION

One aspect of the present disclosure includes a memory card pack. The memory card pack comprises an adaptor insertable in a memory slot of an application device and including a semiconductor chip having a control circuit therein and an expansion socket including a plurality of slots, each slot being configured to receive a memory card, and a plurality of contacts electrically connecting the control circuit to each memory card.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EMBODIMENTS

Figure 1:
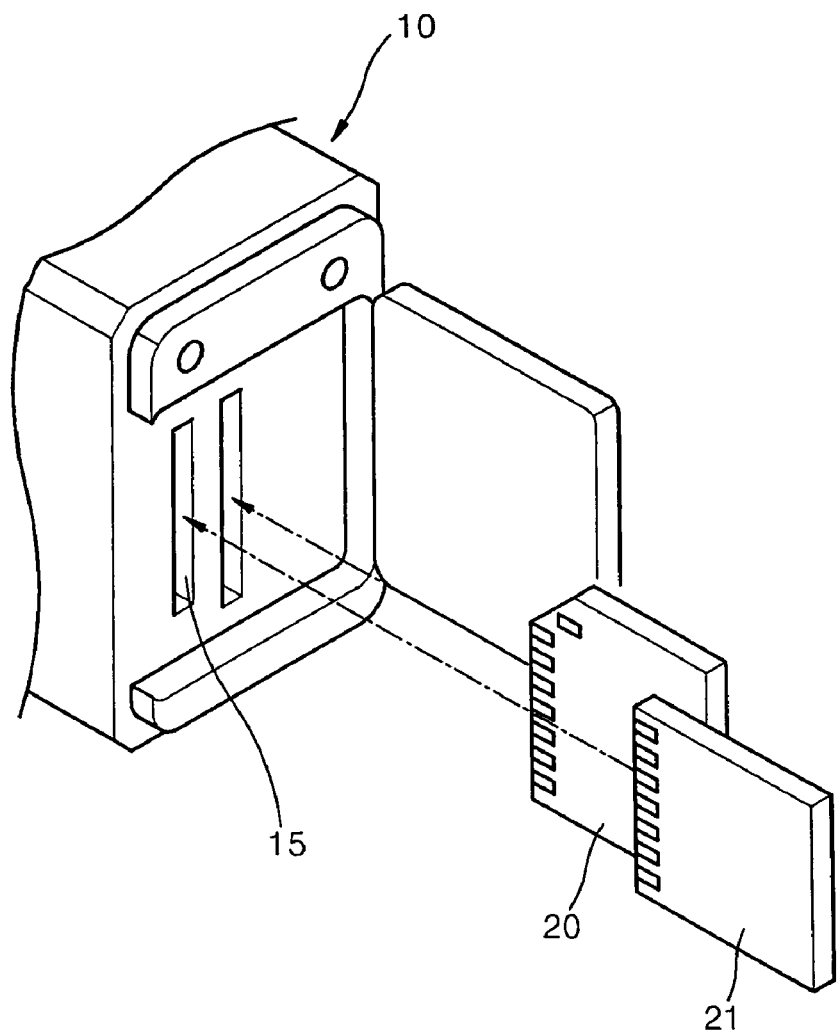
FIG. 1 is a perspective view illustrating a memory card used in a digital camera as an exemplary digital device.

The present invention will now be described more fully with reference to the accompanying drawings, in which exemplary but non-limiting embodiments of the invention are shown.

The invention may be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 2:
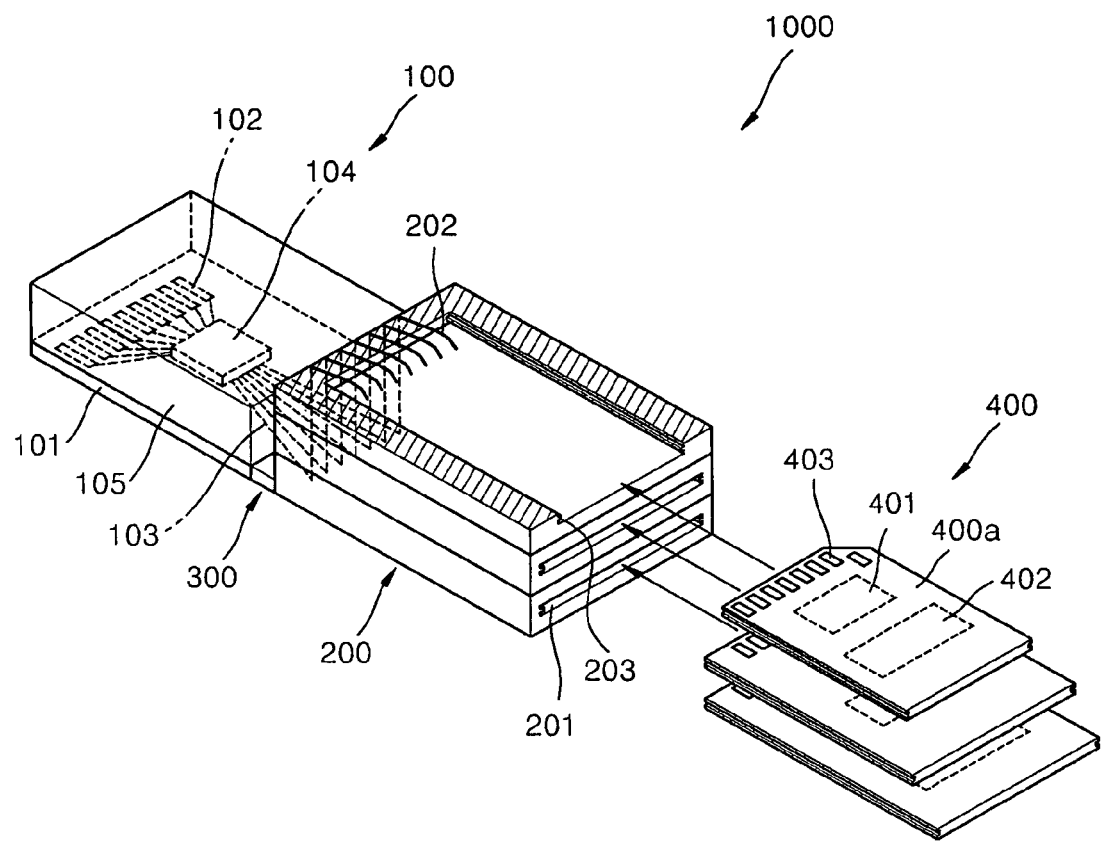
FIG. 2 is a perspective view illustrating a memory card pack according to an exemplary disclosed embodiment.

FIG. 2 is a perspective view illustrating a memory card pack 1000 according to an exemplary disclosed embodiment. Referring to FIG. 2, a memory card pack 1000 includes an adaptor 100 inserted in a memory slot (not shown) of an application device, a memory (i.e., capacity) expansion socket (hereinafter, referred to as an expansion socket) 200 including a plurality of contacts 202, and a plurality of slots 201 in which memory cards 400a are inserted.

In an exemplary embodiment, instead of a memory card 400a, the adaptor 100 is inserted in a memory slot (not shown) of an application device. Furthermore, the adaptor 100 includes a substrate 101, a semiconductor chip 104 including a control circuit, and a lid 105 protecting the substrate 101 and the semiconductor chip 104. In addition, conductive lines 103 are formed on the substrate 100 to form an electrical connection with the contacts 202 and an external connection terminal 102. Moreover, the semiconductor chip 104 is mounted on the substrate 101 and is coupled to the conductive lines 103.

When the adaptor 100 is inserted in a memory slot of an application device, the control circuit allows the memory card pack 1000 to be recognized as a memory card which is commonly used in the application device. Specifically, the control circuit functions as a common interface between the application device and various memory cards inserted in the expansion slots. For example, the memory card pack 1000 may be recognized, due to the control circuit, as one of common memory cards including a memory stick card, a smart media card, a secure digital card, a mini secure digital card, a multimedia card, and the like.

Figure 3:
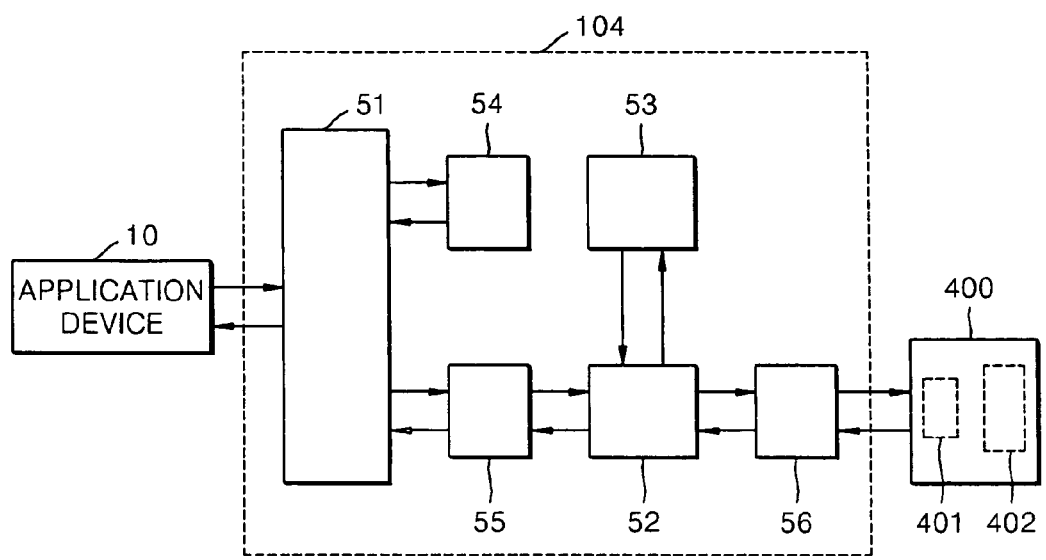
FIG. 3 is a block diagram illustrating a control circuit illustrated in FIG. 2.

FIG. 3 is a block diagram illustrating the control circuit formed in the semiconductor chip 104 of FIG. 2. Referring to FIG. 3, the control circuit includes an interface 51 with an application device 10, a central processing unit 52 including a microprocessor, an internal memory 53 storing operational records of the central processing unit 52, a buffer memory 55 for data input/output, a control logic unit 54 controlling the buffer memory 55, and a memory control unit 56 controlling the memory card 400. In general, the memory card 400 includes a memory array 402 and a dedicated control unit 401 controlling the memory array 402.

In an exemplary embodiment, the control circuit on the semiconductor chip 104 may be configured to emulate the different kinds of memory cards 400a inserted in the expansion socket 200 of FIG. 2. Because of such an emulation, although different kinds of memory cards 400a may be inserted into the expansion socket 200, the memory card pack 1000 operates as if the memory card 400a that is actually compatible with the application device is in use. One skilled in the art will appreciate that the disclosed control circuit may be designed and/or modified into various other configurations by using hardware, software, or any combination thereof to perform the emulation, without departing from the scope of the disclosure.

Referring again to FIG. 2, the slots 201 of the expansion socket 200 may be manufactured according to various specifications that correspond to the different memory cards 400a. For example, each slot 201 may be manufactured for a particular type of memory card 400a. Specifically, each slot 201 may include a guide portion 203 allowing the memory card 400a to be slidingly inserted thereinto. Furthermore, the slot 201 may include a card separation unit (not shown). The card separation unit may be configured to fix the inserted memory card 400a and elastically push out the memory card 400a to eject the memory card 400a. Various mechanisms well known in the art may be used to insert and eject the memory card 400a into/from each slot 201. For example, the card separation unit (not shown) may fix the memory card 400a with a notch formed at the memory card 400a and may elastically push out the memory card 400a with an appropriate spring member.

In an exemplary embodiment, the contacts 202 are connected to the control circuit. Furthermore the contacts 202 electrically connect the control circuit on the semiconductor chip 104 to the memory card 400a inserted in the slot 201. The contact 202 may be made of various materials. For example, as shown in FIG. 2, the contact 202 may be an elastic pin operably connected to a contact pad 403 of the memory card 400a. Specifically, the contact 202 may connect to memory card 400a such that contact 202 presses against the contact pad 403.

The memory card pack 1000 may further include a connection part 300. The connection part 300 may be configured to allow attachment/detachment of the adaptor 100 to/from the expansion socket 200. Specifically, the connection part 300 may fix the adaptor 100 and the expansion socket 200 together by being coupled to end portions of the adaptor 100 and the expansion socket 200, or may separate the adaptor 100 and the expansion socket 200 from each other in the opposite manner. Furthermore, the adaptor 100 and the expansion socket 200 may be beneficially configured to have end portions that can be fit into each other for fixation or can be separated. Because the adaptor 100 can be fixed to or separated from the expansion socket 200, the mobility of the memory card pack 1000 can be improved, and the expansion socket 200 becomes replaceable. As a result, when slots 201 of an expansion socket 200 are formed to allow insertion of different memory cards, a user can desirably select an expansion socket suitable for a user's memory card.

Figure 4:
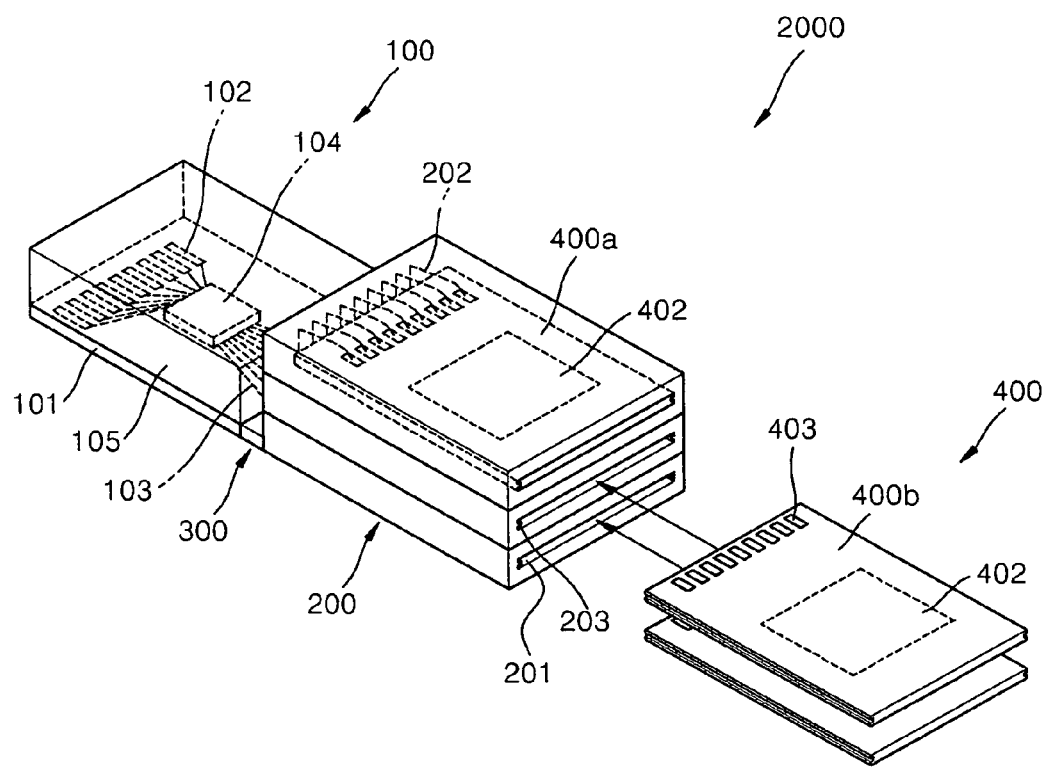
FIG. 4 is a perspective view illustrating a memory card pack according to an alternative exemplary disclosed embodiment.

FIG. 4 is a perspective view illustrating a memory card pack 2000 according to an alternate exemplary embodiment. Referring to FIG. 4, the memory card pack 2000 includes an adaptor 100 and an expansion socket 200 like the memory card pack illustrated in FIG. 3. However, unlike the exemplary embodiment disclosed in FIG. 2, a memory card 400b having only a memory array 402 is inserted in the expansion socket 200. That is, the memory card 400b having only a memory array 402 does not have a dedicated control unit 401 of FIG. 2 which controls the memory carry 402. Examples of such a memory card 400b having only a memory array 402, include XD cards of, for example, Olympus Group or Fuji film Co.

A control circuit formed in a semiconductor chip 104 of the adaptor 100 functions as a common control unit of the memory cards 400b that are mounted on the expansion socket 200 and that have no control units. Thus, like the control unit 401 of the memory card, the control circuit on the semiconductor chip 104 receives an address, a command signal, a control signal and data from an application device, transmits the signals to a specific memory card 400b of the expansion socket 200, receives a control signal and data from the specific memory card 400b, and retransmits the signals to the application device. Furthermore, in an exemplary embodiment, the control circuit may have a configuration that is similar to that illustrated in FIG. 3 so as to function as a common control unit.

Such a memory card 400b having only a memory array 402 without a control unit is increasingly being used because of its reduced manufacturing costs. This reduction in manufacturing costs is associated with the lack of a control unit on the memory card itself. Thus, the exemplary disclosed memory card pack may be used to expand memory capacity relatively cheaply by use of cheap memory cards. Furthermore, the absence of a control unit on the memory card may increase the speed of operation of the application device using the memory card pack.

The memory card pack 1000 may further include a connection part 300. The connection part 300 may be configured to allow attachment/detachment of the adaptor 100 to/from the expansion socket 200. Specifically, the connection part 300 may fix the adaptor 100 and the expansion socket 200 together by being coupled to end portions of the adaptor 100 and the expansion socket 200, or may separate the adaptor 100 and the expansion socket 200 from each other in the opposite manner. Furthermore, the adaptor 100 and the expansion socket 200 may be beneficially configured to have end portions that can be fit into each other for fixation or can be separated. Because the adaptor 100 can be fixed to or separated from the expansion socket 200, the mobility of the memory card pack can be improved, and the expansion socket becomes replaceable.

Figure 5A:
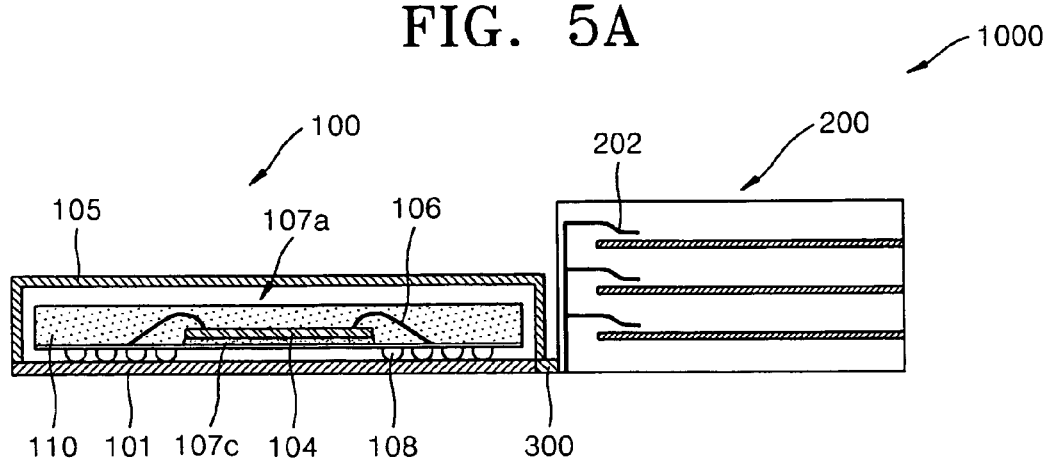
FIGS. 5A through 5C are sectional views illustrating an adaptor structure of FIGS. 2 and 4.
Figure 5B:
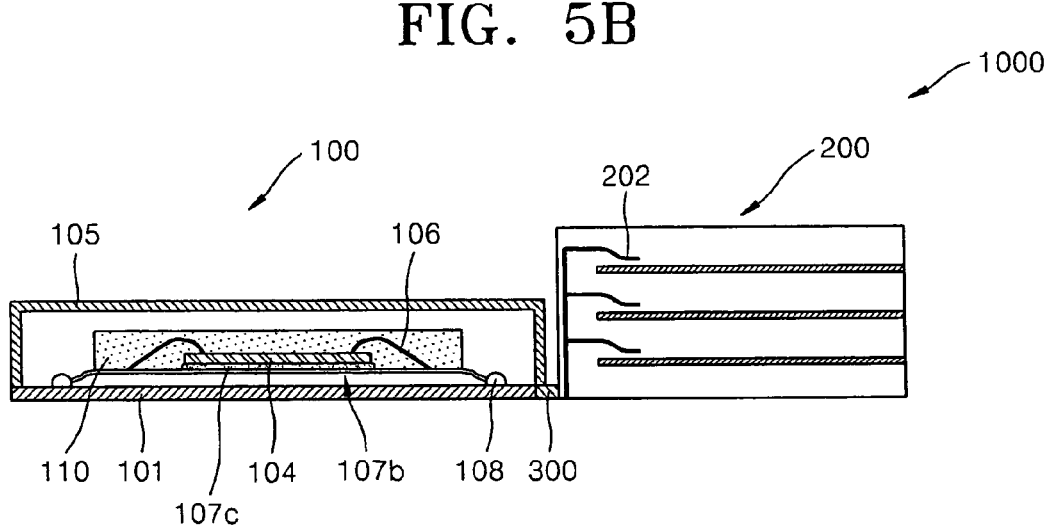
Figure 5C:
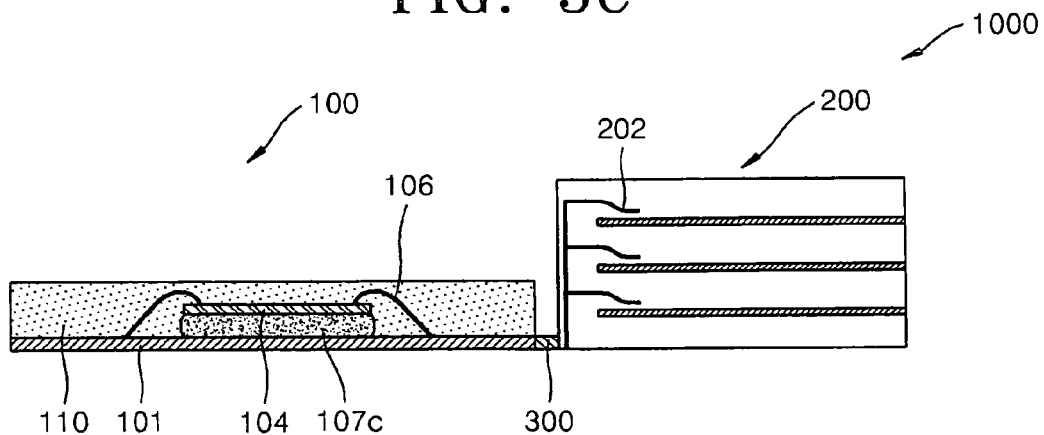

FIGS. 5A through 5C are cross-sectional views illustrating an adaptor structure of FIGS. 2 and 4. Referring to FIGS. 5A through 5C, an adaptor 100 includes a substrate 101, such as, for example, a printed circuit board, where conductive lines 103 of FIGS. 2 and 4 are formed for an electrical connection with contacts 202 and an external connection terminal 102; a semiconductor chip 104 mounted on the substrate 101 and having a control circuit; and a lid 105 protecting the substrate 101 and the semiconductor chip 104.

More specifically, referring to FIG. 5A, the semiconductor chip 104 may be cased in the lid 105 when the packaging of the adaptor is complete. Furthermore, even though a ball grid array (BGA) package 107a is illustrated in FIG. 5A, alternatively, the following types of semiconductor packages may be mounted on the substrate 101: a thin small outline package (TSOP), a dual inline package (DIP), a quad flat package (QFP), or a chip scale package (CSP). In addition, any other type of packaging that may be used to package the adaptor 100 may also be used without departing from the scope of the disclosure. Moreover, the conductive lines 103 of FIGS. 2 and 4 may be coupled to the semiconductor chip package 107a by solder balls 108 or wires (not shown). In addition, reference numeral 107c represents an attachment material for the attachment of the semiconductor chip 104.

Referring to FIG. 5B, in an exemplary embodiment, the semiconductor chip 104 having a control circuit is wire-bonded with a lid frame 107b and is encapsulated by a molding member such as, for example, an epoxy mold compound (EMC). Furthermore, the lid frame 107b may be mounted on the substrate 101 by the solder balls 108. In addition, referring to FIG. 5C, the semiconductor chip 104 having the control circuit may be attached directly onto the substrate 101 by an adhesive agent 107c. Moreover, the semiconductor chip 104 may be electrically connected to the conductive lines 103 of FIGS. 2 and 4 by a wire 106, and encapsulated by a molding member 110 such as EMC. In this case, the molding member 110 replaces a lid. In such a manner, the adaptor 100 may be manufactured to have a variety of structures according to slot specifications of an application device being used.

Although the present disclosure is primarily associated with commercial memory cards such as, for example, a memory stick card, a smart media card (SM), a secure digital card (SD), a mini secure digital card (mini SD), a multi medial card (MMC) or an extreme digital card (XD), the disclosed memory pack can be used with any memory card that includes a memory array. Furthermore, as described above, the disclosed memory pack includes a control circuit that can control a plurality of memory cards at the same time. In addition, the disclosed memory card pack includes an expansion socket that can hold a plurality of memory cards. The control circuit and expansion socket in the memory card may allow for the use of memory cards having different specifications on one digital device. This feature may be especially useful in high performance digital devices where the memory capacity of the device may be increased by adding a memory card to an existing low capacity memory card. Thus, there may be no need to discard existing memory cards. This use of memory cards having different storage capacities and different specifications on the same digital device may reduce the overall cost of memory storage on a digital device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A memory card pack comprising:
   an adaptor including a housing and a semiconductor chip contained within the housing, wherein the housing is configured for direct insertion into a memory slot of an application device such that the semiconductor chip is located within the memory slot when the housing is inserted into the memory slot, and wherein the semiconductor chip includes a control circuit therein; and
   an expansion socket including a plurality of slots, each slot being configured to detachably receive a respective memory card, and a plurality of contacts electrically connecting the control circuit to each memory card.

2. The memory card pack of claim 1, wherein the control circuit comprises:
   an interface with the application device;
   a central processing unit comprising a microprocessor;
   an internal memory which stores operational records of the central processing unit;
   a buffer memory which inputs/outputs data;
   a control logic unit which controls the buffer memory; and
   a memory control unit which controls each respective memory card.

3. The memory card pack of claim 1, wherein at least one of the respective memory cards comprises a dedicated control unit which controls a memory array on the memory card.

4. The memory card pack of claim 3, wherein the control circuit is an emulator which recognizes and controls different kinds of the respective memory cards inserted in the expansion socket.

5. The memory card pack of claim 3, wherein each of the respective memory cards is one selected from the group consisting of a memory stick card, an SM (smart media) card, an SD (secure digital) card, a mini SD (mini secure digital) card, an MMC (multi media) card, and a combination thereof.

6. The memory card pack of claim 5, wherein the memory array comprises a non-volatile memory cell.

7. The memory card pack of claim 3, wherein the memory array comprises a non-volatile memory cell.

8. The memory card pack of claim 1, wherein each of the respective memory cards includes a memory array.

9. The memory card pack of claim 8, wherein at least one of the memory cards is an XD (extreme digital) card.

10. The memory card pack of claim 1, wherein each slot comprises a guide portion which allows the respective memory card to be slidingly inserted thereinto.

11. The memory card pack of claim 10, wherein each slot further comprises a card separation unit which fixes the respective memory card and elastically pushes out the respective memory card to eject the respective memory card.

12. The memory card pack of claim 1, wherein the contacts are electrically connected to the respective memory card by pressing a contact pad of the respective memory card, and are formed of an elastically deformable material.

13. The memory card pack of claim 1, wherein the adaptor comprises:
   a substrate including conductive lines electrically connected to the contacts and an external connection terminal;
   the semiconductor chip mounted on a surface of the substrate and coupled to the conductive lines; and
   a lid encasing the substrate and the semiconductor chip to define the housing of the adaptor configured for insertion into the application device.

14. The memory card pack of claim 13, wherein the adaptor further comprises a lid frame coupled to the conductive lines on the substrate, and the semiconductor chip is disposed on the lid frame and is encapsulated by a molding member.

15. The memory card pack of claim 14, wherein the molding member is an EMC (epoxy mold compound).

16. The memory card pack of claim 1, wherein the adaptor comprises:
   a substrate including conductive lines electrically connected to the contacts and an external connection terminal;

the semiconductor chip mounted on a surface of the substrate and coupled to the conductive lines; and a molding member encasing the substrate and the semiconductor chip to define the housing of the adaptor configured for insertion into the application device.

17. The memory card pack of claim 16, wherein the molding member is an EMC (epoxy mold compound).

18. The memory card pack of claim 1, wherein the semiconductor chip is packaged in any one of a TSOP (thin small outline package), a BGA (ball grid array) package, a DIP (dual inline package), a QFP (quad flat package), and a CSP (chip scale package).

19. The memory card pack of claim 1, wherein the adaptor and the expansion socket are fixed to each other.

20. The memory card pack of claim 1, wherein the adaptor and the socket are separated from each other.

* * * * *